May 18, 1965 J. A. CURTIS, JR 3,184,551

AUTOMATIC TELEPHONIC TIMER

Filed March 26, 1962

INVENTOR.
JOSEPH A. CURTIS, JR

BY

William C. Babcock

ATTORNEY 3,184,551
Patented May 18, 1965

3,184,551

AUTOMATIC TELEPHONIC TIMER

Joseph A. Curtis, Jr., 917 Cambridge St., Apt. A, Anaheim, Calif.

Filed Mar. 26, 1962, Ser. No. 182,333
3 Claims. (Cl. 179—7.1)

The present invention relates generally to the field of telephone accessories, and more particularly to a device that may be removably attached to a dial telephone to automatically indicate when a predetermined period of time has expired during a telephone conversation.

As is well known, it is extremely difficult to determine the amount of time spent during a telephone conversation, and while various timing devices have been proposed for this purpose in the past, they have received but limited acceptance. Primarily, these prior devices have been of a type that require a separate operation on the part of the user other than dialing a desired number. Due to these previous devices being separate and apart from the telephone, they are frequently moved out of reach of the user and thereby not used or forgotten.

A primary purpose in devising the present invention is to provide a timing device that is removably attachable to a dial telephone by a simple manual operation, which device is automatically actuated when the user dials a telephone number.

Another object of the invention is to supply a timing device that is of simple mechanical structure, requires little or no maintenance attention, can be manufactured from standard commercially available materials, and sold at a sufficiently low retail price as to encourage widespread use thereof.

A still further object of the invention is to furnish an automatic telephone timing device that emits an audible signal after a predetermined length of time, normally three minutes, but which includes visual means for indicating the passage of time after the initial period of time has expired.

These and other objects of the present invention will become apparent from the following description thereof, and from the accompanying drawing in which.

Figure 6:
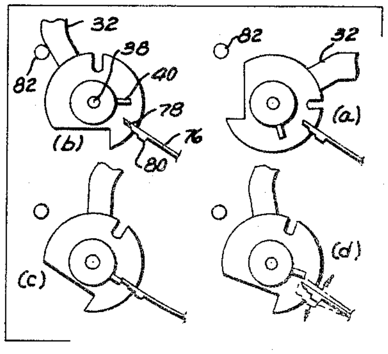

FIGURE 6*a* is a bottom plan view of a portion of the timer before a number has been dialed;

FIGURE 6*b* is a bottom plan view of the same portion of the invention shown in a second position after a number has been dialed;

FIGURE 6*c* is a bottom plan view of that portion of the invention shown in FIGURE 6*a* but showing the actuating lever after return to its initial position; and FIGURE 6*d* is a bottom plan view of the same portion of the timer shown in FIGURE 6*c*, illustrating the position the actuating lever occupies after the device has given an audible signal.

With continuing reference to the drawing for the general arrangement of the telephonic timer of the present invention, it will be seen that the device is adapted to be removably mounted on a telephone A of a type comprising a base B which removably supports a receiver C and is provided with a dial D. A stop E extends over the dial D, as may best be seen in FIGURE 2, and is supported from the base B by an upwardly extending rigid member F, best shown in FIGURE 3.

Figures 1, 2, 3, 4:
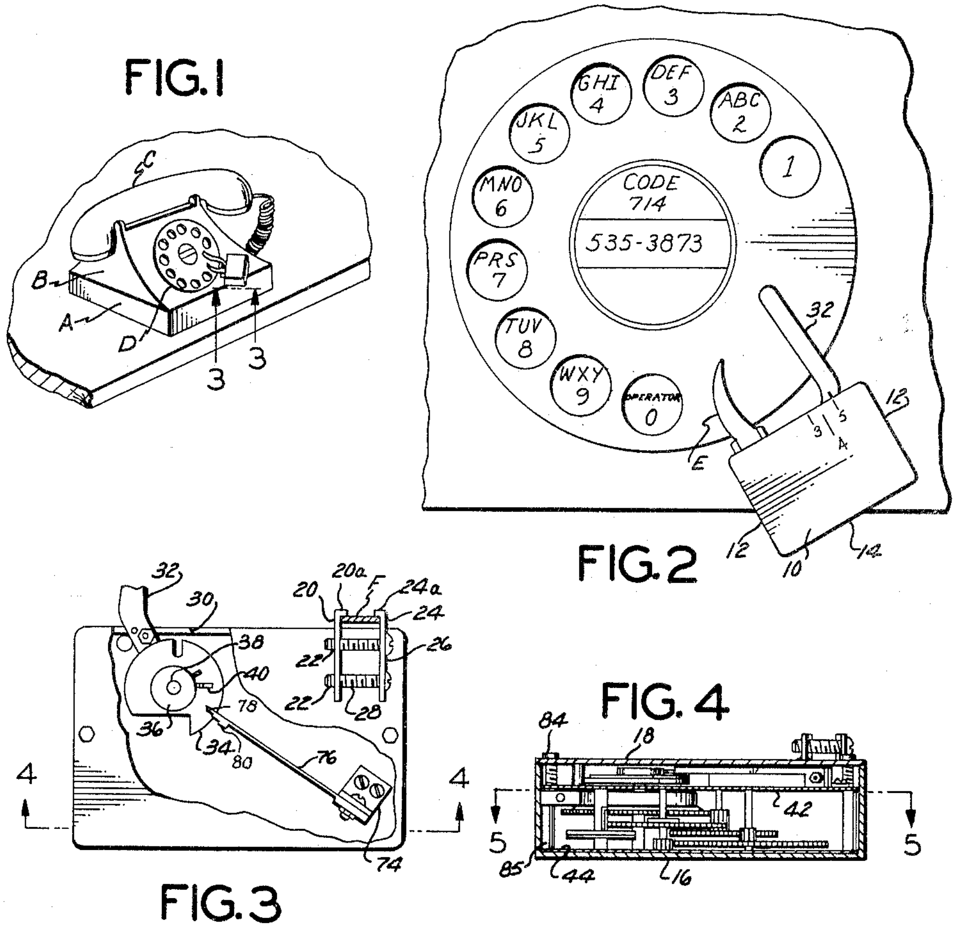
FIGURE 1 is a perspective view of the present invention removably mounted on a dial telephone.
FIGURE 2 is an enlarged plan view of a portion of a dial telephone with the timing device mounted thereon.
FIGURE 3 is a bottom plan view of the timer with a portion of the housing broken away to expose the interior thereof.
FIGURE 4 is a longitudinal cross-sectional view of the timer taken on line 4—4 of FIGURE 3.

The timer includes a housing 10 comprising end walls 12 and side walls 14, a bottom 16 and a top 18, as illustrated in FIGURE 4. The bottom 16 has a first transversely disposed arm 20 rigidly affixed thereto, and this arm has two tapped bores 22 formed therein. A second arm 24 is provided that has two bores 26 extending therethrough. Lips 20*a* and 24*a* are provided on the outer end portions of arms 20 and 24. Two screws 28 extend through bores 26 and threadedly engage the tapped bores 22. When the screws 28 are tightened, the arm 24 can be caused to move to the left as shown in FIGURE 3 and cooperate with first arm 20 to grip the support F therebetween and removably hold the housing 10 in the position shown in FIGURE 2 on telephone A.

The housing 10 has a slot 30 formed in the upper side wall 14 thereof as shown in FIGURE 3. An actuating lever 32 projects through slot 30 from the interior of housing 10. The lever 32 is movable in a plane other than that in which the stop E is disposed. When the finger (not shown) of a user engages the lever 32, the lever is pivoted from a first position shown in FIGURE 2 to a second position to overlie stop E. Lever 32 is connected by conventional means to a circular plate 34. Plate 34 is frictionally gripped between upper and lower circular nuts 36 that engage threads (not shown) on the upper end of a stem 38. The stem 38 is disposed in a direction normal to the bottom 16 and top 18 of housing 10.

Figure 5:
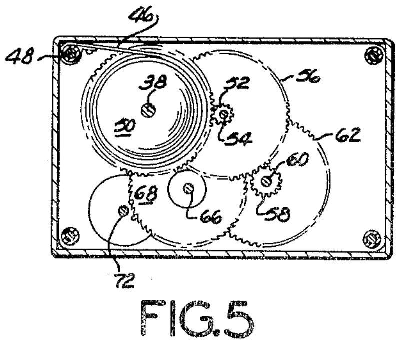
FIGURE 5 is a longitudinal cross-sectional view of the timer taken on line 5—5 of FIGURE 4.

The upper nut 36 has an arm 40 projecting therefrom. Situated within the confines of the housing 10 is a first plate 42 (FIGURE 4) that is held therein by conventional means, and is parallel to the bottom 16 spaced a substantial distance thereabove. A second plate 44 is located within the housing 10, and is in abutting contact with the interior surface of bottom 16. A helical spring 46, preferably a watch spring, is also situated within the housing 10 and one end thereof is connected to a convenient portion 48 of the housing. The opposite end of spring 46 is connected to stem 38. When the spring 46 is coiled as shown in FIGURE 5, it tends at all times to rotate stem 38 in the conventional manner.

Stem 38 has a spur wheel 50 mounted thereon which engages a first pinion 52 that is mounted on a first shaft 54. Shaft 54 has a second spur wheel 56 affixed thereto, which wheel engages a second pinion 58. Second pinion 58 (FIGURE 5) is mounted on a second shaft 60 that also supports a third spur wheel 62. Spur wheel 62 engages a third pinion 64 which is mounted on a third shaft 66. Shaft 66 also supports a toothed wheel 68, the speed of which is regulated by engagement with an anchor escapement 70 of conventional design and of a type used in clocks. The anchor escapement 70 is affixed to a fourth shaft 72. The purpose of the anchor escapement 70 is to regulate the rate at which the stem 38 rotates, and although this anchor escapement is convenient for this purpose, it will be apparent that any one of a number of other escapement mechanisms may be used for the same purpose if desired.

As may best be seen in FIGURE 4, the stem 38 and shafts 54, 60, 66 and 72 are all parallel and the ends thereof are journaled in openings formed in the first and second plates 42 and 44 respectively. Plate 42, as may be seen in FIGURE 4, has an L-shaped bracket 74 or other supporting means affixed to the upper surface thereof. The bracket 74 supports an elongate resilient spring 76 that extends to a position where the end 78 thereof is contacted by the arm 40 as the arm moves from the position shown in FIGURE 6*c* to that shown in FIGURE 6*d*. The end 78 of spring 76 has a small weight 80 affixed thereto to cause the spring to vibrate and impart a noise after the arm 40 has passed thereby as shown in FIGURE 6*d*.

A stop 82 extends downwardly through housing 10, which stop is contacted by the lever 32 when the lever moves through the position shown in FIGURE 6*a* to that shown in FIGURE 6*b*. The top 18 is removably held on housing 10 by screws 84, or other conventional means. As may be seen in FIGURE 4, the screws 84 extend downwardly through openings formed in the top 18 to engage tapped members 85 that are rigidly affixed to the interior.

Operation of the invention is quite simple. The screws 22 are used as previously explained to move the second arm 24 relative to the first arm 20 to cause the arms to removably grip the support F and hold the invention in the position shown in FIGURE 2 on telephone A. When the dial D is used, the finger of the user (not shown) will move the lever 32 from a first position to a second position shown in FIGURE 6*b*, where it overlies the stop E which forms a part of the telephone A.

At this point the spring 46 has been further tightened into a coiled configuration of the lever 32, and when a telephone number has been completely dialed the lever will tend to be moved from the position shown in FIGURE 6*b* to return to that shown in FIGURE 2. Rotation of the spur wheel 50 and stem 38 is governed by the anchor escapement 70. The anchor escapement 70 so cooperates with the spring 46, the stem 38, and the spur wheels and pinions previously described, that it takes three minutes for the lever 32 to move from a position where it overlies the stop E as shown in FIGURE 6*b* to the position shown in FIGURE 6*d* where the spring 76 is vibrating to give an audible signal that three minutes has expired since the number had been dialed.

The spring 46, of course, initiates operation of the invention as soon as a telephone number has been dialed, but should this be an unduly long time, the user can move the lever 32 to a position where it overlies the stop E when the party being called answers the telephone. When this operation is performed, the time that expires before the spring 76 gives an audible alarm (FIGURE 6*b*) will be exactly three minutes. Unless this last operation is performed, the signal will be given by the spring 76 after the user of the time has talked a period of less than three minutes over the telephone.

If desired, the automatic timer may be set by appropriate positioning of the arm 40 to cause the spring 76 to give an audible alarm after expiration of, say, a period of three minutes and ten seconds after dialing of a number. The additional ten seconds constitutes the average length of time it takes for a person being called to answer the telephone after dialing.

Occasionally, a person making a toll or long distance call by dial telephone will desire to continue the conversation beyond the initial three-minute period. To permit the user of the telephone A to determine this additional period of time, three numbers "3," "4" and "5" are marked on the top 18, as shown in FIGURE 2. When the lever 32 has returned to a position where the spring 76 will emit an audible alarm (FIGURE 6*d*), the longitudinal center line 32*a* of lever 32 that serves as visual indicia is in alignment with the index "3" marked or imprinted on top 18. When four minutes have expired, the longitudinal center line of the lever 32 is in alignment with the index mark "4," and when five minutes have expired, the lever will be aligned with the index "5." Obviously, additional index marks could be provided on top 18, but from a practical standpoint it has been found that except for special circumstances, a time record beyond five minutes is seldom required.

It will be apparent from the preceding description that each time the telephone is dialed, the lever 32 is moved to a second position from which it immediately starts to return to a first position, due to the spring-loading of the stem 38. However, it is only after the last step in the dialing operation is completed that the lever 32 is free to move from the second position where it is disposed above the stop E to the first position without further interruption.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:

1. A timing device for use in automatically signalling the expiration of a predetermined length of time after a number has been dialed on a dial telephone which is provided with a dialing stop that partially extends over a dial on said telephone, including:

(*a*) a housing;

(*b*) first means for removably supporting said housing from a portion of said stop that is disposed to one side of said dial;

(*c*) a lever projecting from said housing that extends over said dial, which lever is at a higher elevation relative to said dial than said stop and normally occupies a first position where said lever will be contacted by a dialing implement prior to contact of said stop by said instrument, which lever also is capable of occupying a second position where it is in substantial vertical alignment with said stop;

(*d*) second means in said housing including a stem for movably supporting said lever;

(*e*) third means in said housing that at all times tend to move said second means and said lever in a direction to return said lever to said first position at a uniform rate;

(*f*) fourth means in said housing for regulating the rate at which said third means moves said second means and lever from said second position towards said first position;

(*g*) fifth means in said housing that audibly signals after said lever and second means have been moving from said second position toward said first position for a predetermined length of time;

(*h*) visual indicia on said lever; and (*i*) a plurality of longitudinally spaced and numbered lines imprinted on the upper surface of said housing past which said lever moves in returning to said first position, with said indicia when in alignment with one of said numbered lines visually indicating the number of minutes said telephone has been used.

2. A device as defined in claim 1 wherein said fifth means is a rigid arm that is moved as said stem rotates, which device further includes:

(*a*) an elongate spring, a first end of which is held in a fixed position relative to said housing with a second end of said spring being adapted to be contacted by said arm supported from said stem as said stem rotates when said lever moves from said second to said first position.

3. A device as defined in claim 1 wherein said elongate spring has a weight mounted on said second end thereof to cause vibration of said spring and emit said audible signal after said elongate spring has been contacted by said arm supported from said stem and bent to the extent that it becomes disengaged from said arm supported from said stem.

(References on following page)

References Cited by the Examiner

UNITED STATES PATENTS

| | | | |
|---|---|---|---|
| 2,202,149 | 5/40 | Gottlieb | 179—7.1 X |
| 2,335,632 | 11/43 | Beal | 340—309 |
| 2,609,045 | 9/52 | Kaiser | 179—7.1 X |
| 2,615,093 | 10/52 | Weyrauch | 179—7 |
| 2,629,781 | 2/53 | Feinstein | 179—7.1 |
| 2,941,350 | 6/60 | Rogovin | 58—144 |

ROBERT H. ROSE, *Primary Examiner.*

WALTER H. LYNDE, *Examiner.*